United States Patent [19]

Noguchi et al.

[11] Patent Number: 4,740,379
[45] Date of Patent: Apr. 26, 1988

[54] PROCESS FOR PRODUCTION OF MEAT ANALOGUE BY INJECTION MOLDING

[75] Inventors: Akinori Noguchi; Nobuaki Ishida; Seiichiro Isobe, all of Ibaraki, Japan

[73] Assignees: Director of National Food Research Institute, Ibaraki; Ministry of Agriculture Forestry & Fisheries, both of Ibaraki, Japan

[21] Appl. No.: 12,316

[22] Filed: Feb. 9, 1987

[30] Foreign Application Priority Data

Nov. 14, 1986 [JP] Japan .................... 61-269780

[51] Int. Cl.$^4$ .................... A22C 11/04; A23P 1/00
[52] U.S. Cl. .................... 426/512; 17/38; 99/441; 264/328.7; 425/577; 426/513
[58] Field of Search ............ 426/512, 513; 99/441; 17/38, 39; 425/542, 544, 547, 552, 577; 264/328.7, 328.16

[56] References Cited

U.S. PATENT DOCUMENTS 4,113,890 9/1978 Long .................... 426/512

FOREIGN PATENT DOCUMENTS 274001 9/1976 U.S.S.R. .................... 426/513

Primary Examiner—George Yeung
Attorney, Agent, or Firm—Frishauf, Holtz, Goodman & Woodward

[57] ABSTRACT

A process for producing a meat analogue from a starting material having a high protein content comprises injecting the starting material into a mold against a substantially constant back pressure which is provided by a pressurized piston. The starting material is supplied to the mold under continuous high temperature and high pressure, for example, by an extruder, such as a single screw extruder or a twin screw extruder.

18 Claims, 1 Drawing Sheet

PROCESS FOR PRODUCTION OF MEAT ANALOGUE BY INJECTION MOLDING

BACKGROUND OF THE INVENTION

The present invention relates to a process for producing a meat analogue or substitute by injection molding.

Extensive investigations have been made on production of a meat analogue or substitute by the use of an extruder. Meat analogues produced from plant protein are now on the market and have gained public favor. A conventional process uses a single screw extruder, and it has disadvantages in that the permissible water and oil contents of the product must be inevitably decreased in view of the mechanism of the single screw extruder and, therefore, products are necessarily obtained in a dry condition and need troublesome rehydration before use.

In recent years, the production of a meat analogue by the use of a twin screw extruder has been investigated mainly in European countries. It has been found that with the twin screw extruder, a wide variety of starting materials can be used. Based on these findings, and further with the development of a cooling die, a process for production of a meat analogue by the use of a twin screw extruder is now under extensive investigation in order to overcome the above problems which result from use of a single screw extruder.

In the known process using a twin screw extruder, the die is limited in its shape and cannot be freely designed because the structure of the die exit influences the distribution and fluid characteristics of the starting material used in the extruder. Particularly in production of large-sized products, a problem arises in that when a starting material having a high water and oil content is used, sufficient cooling cannot be performed and the product cannot retain its suitable form followed by atmospheric explosion, because it is necessary to increase the opening of the die for production of large-sized products. For this reason, the die opening must be decreased in size and thus only thin products can be produced in the known process using a twin screw extruder.

The influences of the die form on the phenomena in the extruder can be said to be caused mainly by a flow resistance produced by the flow characteristics of a starting material in the neighborhood of the die. That is, since the resistance value cannot be kept constant due to the die form, a die which can be used for a specified starting material is often unusable for other starting materials. When the flow resistance is too low, even if the screw mechanism of the extruder has a sufficient conveyance ability, a starting material with high temperature and high pressure cannot be held in the top portion of the extruder and thus the starting material flies off as fragile small particles.

SUMMARY OF THE INVENTION

The present invention is intended to overcome the above problems of the prior art techniques, and an object of the present invention is to provide a process for production of a meat analogue from a starting material having a high protein content.

In order to hold the starting material with such a high temperature and high pressure in the neighborhood of the die of the extruder, the present inventors have found that it is necessary to apply a back pressure to the material being fed into the mold. In order to prevent the explosion puffing phenomenon, the present inventors found also that it is necessary to employ a closed system into which the starting material is continuously extruded through a die and is subjected to aging for a necessary period of time.

The process of the present invention for production of a meat analogue from a starting material having high protein content, is characterized in that the starting material is injected into a mold capable of applying a substantially constant back pressure, the material being fed into the mold by means of an apparatus having a continuous high temperature and high pressure function.

The present invention has advantages over the conventional process utilizing extrusion molding in that the permissible water and oil content of a starting material can be high, the heat treating time is easy to control, and further, the product shape is free from the design of the die exit and thus a large-sized meat analogue can be produced.

BRIEF DESCRIPTION OF THE DRAWINGS

FIGS. 1(a) to 1(e) show the steps in the practice of the process of the present invention, wherein:

FIG. 1(a) shows a molten starting material reaching the top of a piston in a mold from an adapter having a by-pass through a breaker plate in an extruder;

FIG. 1(b) shows the starting material being charged into the mold;

FIG. 1(c) shows a state wherein after completion of the charging of the starting material, the molten starting material is allowed to flow in the by-pass by the use of a change over valve of the adapter;

FIG. 1(d) shows a state wherein a valve at the right-hand side of the mold is closed and the charged starting material is cooled in the mold; and FIG. 1(e) shows a state wherein after being sufficiently cooled, the molded product is pushed out of the mold by the piston.

DETAILED DESCRIPTION OF THE INVENTION

Figure 1A:
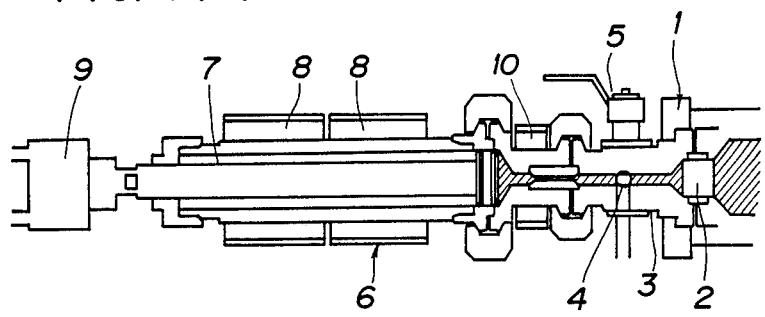

The usable starting materials for production of a meat analogue by the process of the present invention may include all high protein content materials such as grains, beans, fish and animal meat used in production of foodstuffs. These materials can be used alone or in combination with each other, or further in combination with other suitable materials. The starting material having a high protein content means a material which contains at least 15 percent by weight of protein in its edible portion as is. The edible portion means a portion excluding a non-utilized (or abandoned) portion from the total foodstuff.

As seen from the drawings, the present invention utilizes an apparatus including a mold 6 having a temperature-controlling function (i.e. temperature controlling jacket 8) as the closed system. One of the above problems inherent in the prior art can be solved because the mold is of the closed system type, and at the same time the shape and size of the mold can be freely selected, as desired. The temperature-controlling function (jacket 8) is utilized to apply heating or cooling if necessary, thereby increasing the product quality.

When the starting material is charged into the mold 6, if there is a space in the inside of the mold, the phenomenon of explosion puffing will partially occur. It has been found that in order to avoid this phenomenon, it suffices to provide a piston 7 which initially fills the inside of the mold 6, and which moves back as the starting material is charged into the mold. In connection with the pressure needed to make the piston 7 move back, since the explosion puffing of the injected starting material is caused by sudden explosive evaporation of water contained in the starting material, it suffices that the pressure is maintained on piston 7 at a level higher than the vapor pressure at the corresponding temperature. In general, the starting material is rarely treated at 200° C. even in a case where an extruder is used, and the vapor pressure at 200° C. is less than 20 kilograms per square centimeter (kg/cm$^2$). Therefore, in order not to convert the water contained in the starting material into high pressure vapor and to keep it as water (i.e., to prevent explosion puffing), it suffices that the moving back pressure on the piston is somewhat higher than the above vapor pressure. It is therefore unnecessary that the piston moving back pressure is maintained at a high level. In fact, the injection pressure rarely exceeds 1,000 kg/cm$^2$ in extruders for foodstuffs, although it varies with the type of the starting material. Accordingly, if the injection pressure is not more than 1,000 kg/cm$^2$ and the piston moving back pressure is maintained at a level somewhat lower than the injection pressure, tne starting material can be safely injected into the mold 6 without explosion puffing occurring. The piston 7 can be driven by oil pressure supplied by oil pressure cylinder 9 and maintained at various values, so that both the resistance in the neighborhood of the die and the distribution of the starting material inside of the twin screw extruder 1 is controlled to a certain extent.

The effectiveness of the present invention will hereinafter be explained.

Figure 1B:
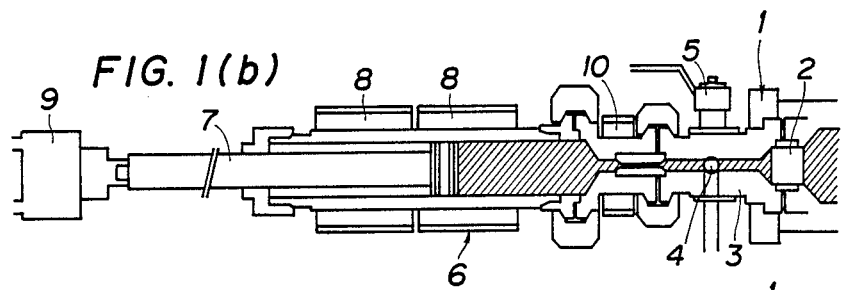
Figure 1C:
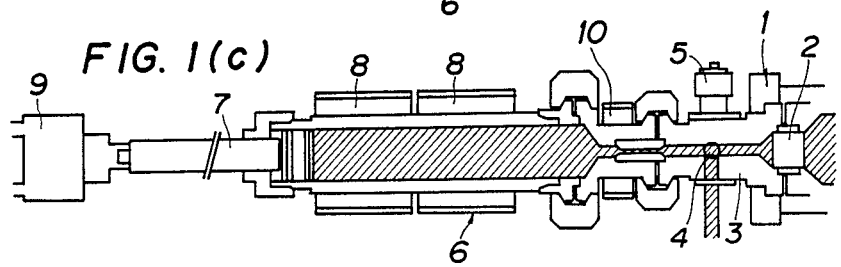
Figure 1D:
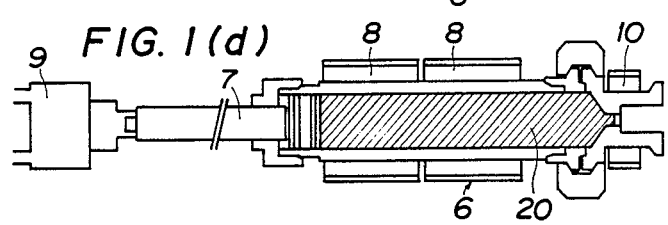
Figure 1E:
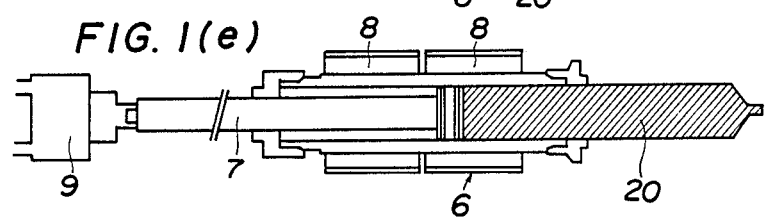

A mold 6 having the structure shown in FIGS. 1(a-)-1(e) was connected to the die position of a twin screw extruder 1 (Model FT-60N manufactured by Mitsubishi Heavy Industry Co., Ltd.). The extruder 1 is only partially shown in the drawings since it is well known. In operation, the extruder 1 feeds starting material (shown by the hatched lines in the drawings) into the mold 6 via the breaker plate 2, adapter 3, by-pass 4 change over valve 5 and closing valve 10. After the starting material fully fills the mold 6, the change over valve 5 is operated so that output materials from the extruder 1 are by-passed out of the system, as shown in FIG. 1(c). Then, the extruder is separated from the mold and the material 20 is held in the mold for a predetermined period of time (under cooling or heating by means of heating/cooling means 8). The heating/cooling means 8 comprises, for example, one or more jackets 8 around the mold 6. Heating or cooling fluid is passed through the jackets 8 around the mold 6. Heating or cooling fluid is passed through the interior spaces of the jackets 8 to provide the desired temperature control. Other heating means, such as electrical heaters or the like could be used in place of fluid-filled jackets. After the material 20 is held in the mold for the desired period of time, the material 20 is ejected from the mold by means of pushing by piston 7 under power from the oil pressure cylinder 9, as shown in FIG. 1(e). The oil pressure cylinder 9 also supplies the back pressure on the piston 7 during filling of the mold as illustrated in FIG. 1(a-)-1(c).

A defatted soy flour (DSF) from brewing as a starting material was quantitatively supplied from a feeder (not shown) to the extruder 1, and water was introduced from the side of a barrel of the extruder (not shown) by means of a high pressure pump (not shown) so as to control the final water content of the product to 60%. The feed rate of all the starting material containing water was set to 15 kilograms per hour (kg/hr). The maximum temperature of the barrel was maintained at 150° C., and the temperature of the mold 6, at 10° C. Back flow of the starting material was not observed with the presence of a high amount of water, and stable operation could be achieved. After the mold was filled with DSF and then sufficiently cooled, the extrudate 20 was stably formed with the same shape as the mold 6, having the same water content as the given value. It has further been found that even if the water content of the starting material was increased to 70%, the operation was stable and the extrudate 20 was properly molded and formed. Taking into consideration that extrusion at the above water content is difficult even by the use of a cooling die in the conventional process, it is apparent that the technique of the present invention is quite effective.

The present invention has the following advantages.

(1) A uniform product can be produced even if the water and/or oil content of a starting material exceeds the capability of the usual prior art die system.

(2) Since there can be obtained a product (extrudate) having the same shape and size as those of a mold, the product is not limited in its shape and size. Accordingly a wide variety of products can be produced.

(3) Completely aseptic packed and sterilized products can be produced by placing a wrapping material in the inside of the mold 6 prior to charging of the starting material. In this case, the resulting molded product is formed within the wrapping material, and a further wrapping process is not required.

(4) Composite products can be produced by placing other starting materials in the inside of the mold 6 prior to charging of the material from the extruder 1. Accordingly, an even larger number of different products can be produced.

(5) The heat treating time can be easily shortened or lengthened, depending on the type of the starting material, and heat aging which is nearly impossible with an extruder alone can be achieved (since mold 6 can be heated by means of jacket 8).

The present invention is described in greater detail below with reference to the following specific examples.

EXAMPLE 1

A defatted soy flour (DSF) from brewing (crude protein: about 55%; nitrogen solubility index: about 30) was treated with (i.e., extruded from) a twin screw extruder 1 which is coupled to a mold 6. The water content of the starting at the time of treatment in the extruder 1 was maintained at 70%, and necessary water to maintain this level was supplied (not shown) into the barrel side of the extruder. During the injection into the mold 6, the temperature of the mold was adjusted to be at 10° C. by flow of coolant or heating fluid through jacket 8. After the mold 6 was fully charged with DSF(by pushing piston 7 back—see FIGS. 1(b) and 1(c)), it was allowed to stand for 10 minutes at the same temperature, and then the formed extrudate 20 was taken out. Operation conditions of the extruder 1 and the mold 6 are shown below.

Starting material feed rate: 15 kg/hr
Screw speed of extruder: 80 rpm
Barrel temperature of extruder: 145° C.

Breaker plate: Used
Inner diameter of the mold 6: 50 mm
Inner length of the mold 6: 250 mm
Temperature of the mold 6: 10° C.
Back pressure on piston 7: 30 kg/cm²
Holding time after charging of the mold: 10 min.

The extrudate 20 thus obtained was a light yellow cylindrical material having meat-like softness and elasticity. This extrudate was cut in vertical and horizontal directions and its inside was examined. This examination showed that the extrudate had a dense structure not containing any voids. Even if the extrudate was pressed, water was held in the product and could not be expelled therefrom. The extrudate was very similar to molded animal meat.

A similar product was obtained when full fat soy flour was used as the starting material. The product was free of running fats and oils, and exhibited good texture and flavor.

EXAMPLE 2

A frozen fish surimi (minced fish) was thawed and then directly supplied to the extruder 1 by the use of a not shown pump such as, for example, a single screw pump of the positive displacement type. The operation conditions of the extruder 1 were the same as in Example 1 above, except that the barrel temperature of the extruder 1 was set to 160° C. and the temperature of the mold 6 was set to 30° C.

The extrudate 20 thus obtained was a white, dense, cylindrical material having an elasticity like that of boiled fish meat. The appearance of the molded product 20 was very similar to the meat of a big cuttle fish which was boiled. Even if the molded extrudate 20 was pressed, water was held theein and could not be expelled therefrom. The extrudate 20 had good texture and flavor.

EXAMPLE 3

Chicken meat had its noticed fat removed and was lightly squeezed to control the water content to about 70%. The chicken meat was then chopped by the use of a cutter and the chopped chicken meat was introduced into an extruder 1. Operation conditions were the same as in Example 1 above, except that the barrel temperature of the extruder 1 was set to 150° C.

The extrudate 20 thus obtained had an elastic, whole structure which was considered to be formed by melting and rearrangement of muscle fiber of the chopped chicken meat, and the size of the extrudate 20 was very large; larger than could be expected from the chicken itself. Furthermore, it had a good flavor inherent of cooked chicken meat.

As used herein, the term "meat analogue" means products made of any or all of the specific starting materials discussed herein, as well as other suitable high protein content starting materials.

What is claimed is:

1. A process for producing a meat analogue from a starting material having a high protein content, comprising:
   injecting said starting material into a cavity of a mold through an entrance of said mold by means of an extruder means, said extruder means imparting a substantially continuous high temperature and high pressure to the starting material being injected into said mold, said high temperature being substantially higher than ambient temperature;
   substantially filling the cavity of said mold with a slidably piston member prior to injection of said starting material into the cavity of said mold, said piston member being slidable into and out of the cavity of said mold;
   applying a substantially constant back pressure to said slidable piston member in said mold by means of a back pressure applying means which is coupled to said piston member, said back pressure being applied to said piston member in a direction to cause said piston member to slide into the cavity of said mold and said piston member being slidable out of the cavity of said mold against said back pressure; and
   said starting material being injected into said mold by means of said extruder means at said substantially continuous high pressure which is higher than said substantially constant back pressure so that said injected starting material displaces said slidable piston member out of the cavity of said mold against the force of said applied back pressure.

2. The process of claim 1, wherein said starting material is injected into said mold by means of a single screw extruder means.

3. The process of claim 1, wherein said starting material is injected into said mold by means of a twin screw extruder means.

4. The process as claimed in claim 1, comprising disconnecting said mold from said extruder means after said mold is filled with said starting material, and ejecting said material from said mold by pushing said material out of said mold by said piston member.

5. The process of claim 4, comprising holding said material in said mold for a given period of time prior to ejecting same therefrom by said piston member.

6. The process of claim 5, comprising maintaining said mold at a predetermined temperature during said given period of time.

7. The process as claimed in claim 1, comprising disconnecting said mold from said extruder means after said mold is filled with said starting material, and ejecting said material from said mold by pushing said material out of said mold by said piston member.

8. The process of claim 7, comprising holding said material in said mold for a given period of time prior to ejecting same therefrom by said piston.

9. The process of claim 8, comprising maintaining said mold at a predetermined temperature during said given period of time.

10. The process of claim 1, comprising holding said material in said mold for a given period of time after filling of said mold.

11. The process of claim 10, comprising maintaining said mold at a predetermined temperature during said given period of time.

12. The process as claimed in claim 10, comprising disconnecting said mold from said extruder means after said mold is filled with said starting material, and ejecting said material from said entrance of said mold by pushing said material out of said entrance of said mold by means of said piston member after the expiration of said given period of time.

13. The process of claim 1, wherein said extruder means injects said starting material at a substantially continuous high temperature of at least about 145° C.

14. The process of claim 1, wherein said substantially constant back pressure is about 30 kg/cm².

15. The process of claim 14, wherein said extruder means injects said starting material at a substantially continuous high temperature of at least about 145° C.

16. The process of claim 1, wherein said step of applying a substantially constant back pressure to said slidable piston member comprises driving said piston member by oil pressure by means of an oil pressure cylinder.

17. The process of claim 13, wherein said substantially constant back pressure which is applied to said slidably piston member is above the vapor pressure of water.

18. The process of claim 1, wherein said substantially constant back pressure which is applied to said slidable piston member is above the vapor pressure of water.

* * * * *

UNITED STATES PATENT AND TRADEMARK OFFICE
CERTIFICATE OF CORRECTION

PATENT NO.  : 4,740,379
DATED       : April 26, 1988
INVENTOR(S) : NOGUCHI et al It is certified that error appears in the above-identified patent and that said Letters Patent is hereby corrected as shown below:

Column 6, line 2 (Claim 1), "slidably" should read -- slidable --.

Column 6, line 47 (Claim 8), "said piston" should read -- said piston member --

Signed and Sealed this

Twenty-fifth Day of October, 1988

Attest:

DONALD J. QUIGG

*Attesting Officer*  *Commissioner of Patents and Trademarks*